United States Patent [19]

Asada et al.

[11] Patent Number: 5,272,471
[45] Date of Patent: Dec. 21, 1993

[54] DISPLAY SYSTEM

[75] Inventors: Shigeki Asada, Yokohama; Masayuki Sohda, Yamato; Hiroaki Yasuda, Sagamihara, all of Japan

[73] Assignee: International Business Machines Corporation, Armonk, N.Y.

[21] Appl. No.: 957,562

[22] Filed: Oct. 7, 1992

[30] Foreign Application Priority Data

Dec. 3, 1991 [JP] Japan .................................. 3-318813

[51] Int. Cl.$^5$ ............................................. G09G 5/10
[52] U.S. Cl. ................................... 345/149; 358/455; 395/132; 345/3
[58] Field of Search ................. 340/703, 793; 395/131, 395/132; 358/455-457, 459, 460

[56] References Cited

U.S. PATENT DOCUMENTS 4,956,638 9/1990 Larky et al. ................. 340/793 X
5,155,478 10/1992 Sekiya et al. ...................... 340/793

OTHER PUBLICATIONS

Pega 2, Users' Guide, Paradise Systems, Inc. 217 East Grand Avenue South San Francisco, Calif. 94080, 1986, pp. 1-14.
Pleshko, Peter, "Halftone gray scale for matrix-addressed displays," Information Display, Oct. 1990, pp. 10-11.

*Primary Examiner*—Ulysses Weldon
*Attorney, Agent, or Firm*—Jack M. Arnold

[57] ABSTRACT

A display system for converting N bit signals, each representing $2^N$ gray levels, to M bit signals representing $2^M$ gray levels, where N is an integer larger than or equal to 2 and M is an integer satisfying $N > M \geq 1$. Each of the N bit signals are separated into higher M bits and lower N−M bits. There are $2^{N-M}$ tables, each of which stores a distinctive set of P×Q modification values satisfying $P \times Q \geq 2^{N-M}$. One of the tables is selected using the N−M bits. Unequality between a first set of modification values and a second set of modification values of the selected table are detected. The first set of modification values and the second set of modification values are exchanged to generate a modified table of the selected table. The M bits of one N bit signal and each of the modification values of the selected table are added to generate a first set of P×Q M bit signals. The M bits of the next N bit signal and each of the modification values of the modified table are added to generate a second set of P×Q M bit signals. The first and second sets of M bit signals are provided to a display device of $2^M$ gray levels.

8 Claims, 10 Drawing Sheets

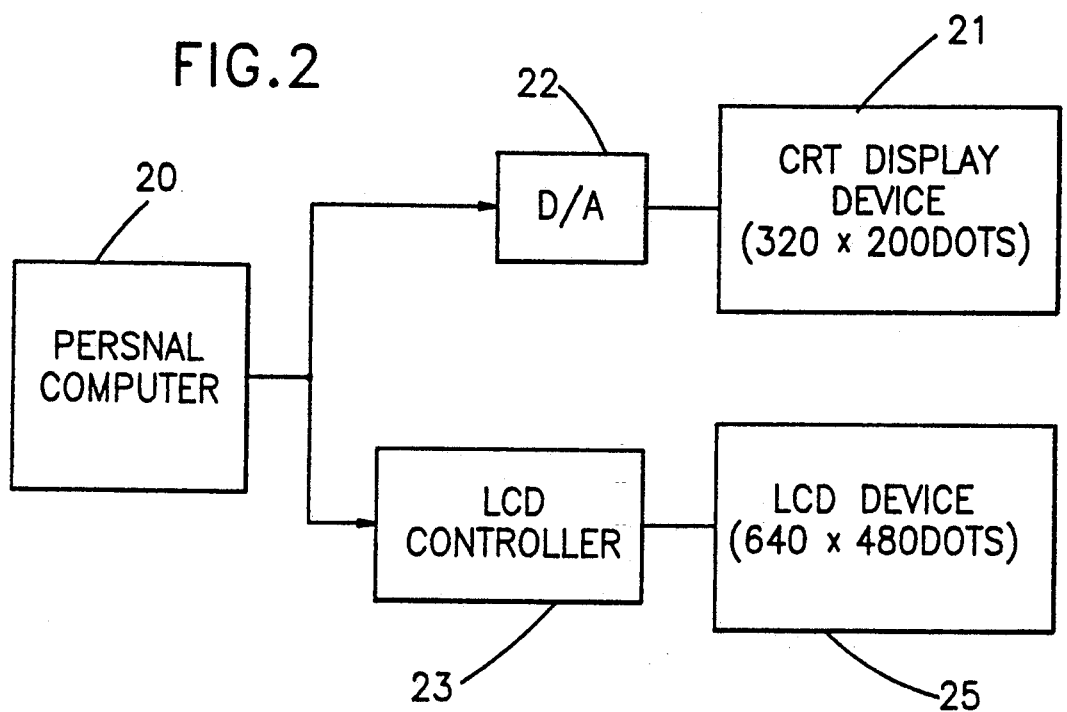
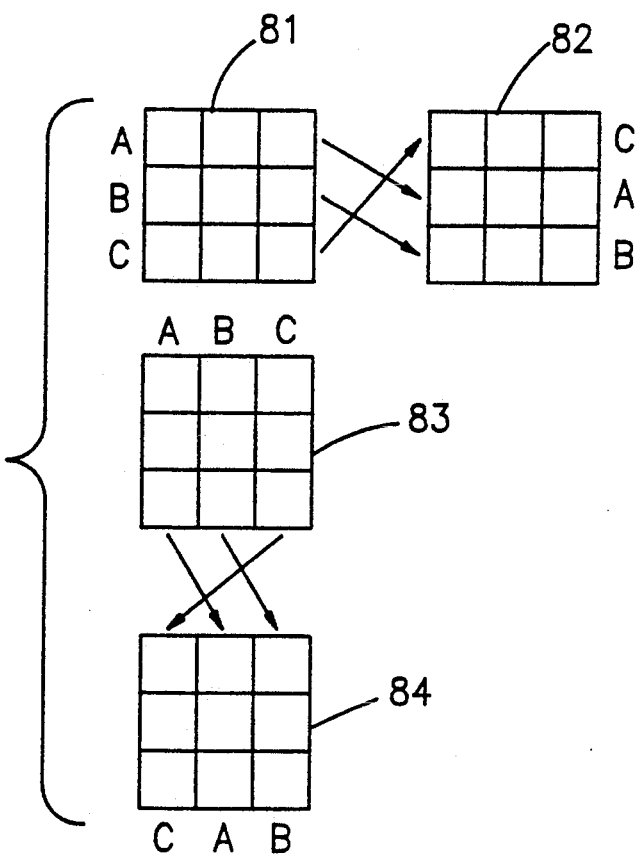

FIG.5

TABLE 7A

TABLE 7

FIG.6

TABLE 6

TABLE 6

| 0 | 0 |
|---|---|
| 0 | -1 |

TABLE 6A

| 0 | 0 |
|---|---|
| -1 | 0 |

FIG.9

|   | 0 | 1 | 2 | 3 |
|---|---|---|---|---|
| 0 | 0 | 0 | 0 | 0 |
| 1 | 0 | -1 | 0 | -1 |
| 2 | 0 | 0 | 0 | 0 |
| 3 | -1 | 0 | -1 | 0 |
| 4 | 0 | 0 | 0 | 0 |
| 5 | 0 | -1 | 0 | -1 |
| 6 | 0 | 0 | 0 | 0 |
| 7 | -1 | 0 | -1 | 0 |
|   | =-2 | =-2 | =-2 | =-2 |

|   | 0 | 1 | 2 | 3 | 4 |
|---|---|---|---|---|---|
| 0 | 0 | 0 | 0 | 0 | 0 |
| 1 | 0 | -1 | -1 | 0 | -1 |
| 2 | 0 | 0 | 0 | 0 | 0 |
| 3 | -1 | 0 | 0 | -1 | 0 |
| 4 | 0 | 0 | 0 | 0 | 0 |
| 5 | 0 | -1 | -1 | 0 | -1 |
| 6 | 0 | 0 | 0 | 0 | 0 |
| 7 | -1 | 0 | 0 | -1 | 0 |
|   | =-2 | =-2 | =-2 | =-2 | =-2 |

TABLE 7
X=1, Y=0

TABLE 8
X=1, Y=1

DISPLAY SYSTEM

FIELD OF THE INVENTION

This invention relates to a display system for converting gray levels of a display device, and more particularly to a display system for converting N bit signal representing $2^N$ gray levels (N being an integer larger than or equal to 2), to M bit signal representing $2^M$ gray levels (M being an integer satisfying $N > M \geq 1$).

BACKGROUND OF THE INVENTION

In the prior art, it has been required to connect two display device, such as CRT (Cathode Ray Tube) display device and LCD (Liquid Crystal Display) device to a personal computer. Such a configuration is shown in FIG. 2, wherein an output of a personal computer 20 is connected to the CRT display device 21 and the LCD device 25 through a digital-analog converter 22 and a LCD controller 23, respectively. Gray levels displayed by the two display devices differ from each other. For example, the CRT display device 21 displays 64 gray levels and the LCD device 25 displays 16 gray levels. The personal computer 20 supplies 64 bit signal for each picture element of the display devices on the output line. The 6 bit signal represents the 64 gray levels of the CRT display device 25. It was required to display the 64 gray levels on the LCD device 25, each pel of which displays only the 16 gray levels. To this end, LCD controller 23 responds each 6 bit signal to generate four 4 bit signals. The 4 bit signal represents the 16 gray levels displayed by one pel of the LCD device 25. And, four pels of the LCD device 25 are used to display the four 4 bit signals, so that if a size of one image supplied from the personal computer 20 is 320×200 pels (dots), the CRT display device 21 has 320×200 dots and the LCD device 25 has 640×400 dots, as shown in FIG. 3. The controller described above is disclosed in Japanese patent application 63-236291 corresponding to U.S. Pat. No. 5,059,962, assigned to the same assignee as that of the present application. Blocks assigned with reference number 1, 2, 3, 4, 5, 6, 7, 8, 9, 10, 12, 21 and 25 in FIG. 1 show the controller of the Japanese patent application 63-236291. Detail operation for generating the four 4 bit signals for the LCD device 25 based upon one 6 bit signal for one pel of the CRT display device 21 will be described hereinafter since the present invention also uses the algorithm of the Japanese patent application 63-236291.

DISCLOSURE OF THE INVENTION

A personal computer generates first gray level signal each dot of which is represented by N bits (N is integer larger than or equal to 2) representing 2N (the Nth power of 2) gray levels. The first gray level signal is supplied to CRT display each dot of which displays 2N (the Nth power of 2) gray levels. Now, the CRT has been replaced by the LCD each dot of which displays 2M (the Mth power of 2) gray levels. The first gray level signal of N bits (N is integer larger than or equal to 2) representing 2N (the Nth power of 2) gray levels is converted to second gray level signal representing 2M (the Mth power of 2) gray levels (M is integer satisfying $N > M > = 1$). The gray level signal is supplied to the LCD. The display system includes means for separating the first gray level signal of N bits into higher M bits and lower N−M bits, 2N−M (the (N−M)th power of 2) tables each of which stores P×Q modification values satisfying $P \times Q > = 2N - M$ (the (N−M)th power of 2), means for selecting one of the tables by using the N−M bits as address, and means for adding the M bits and each of the modification values of the selected table to generate P×Q second gray level signals. In the case that N=6, M=4, P×Q=2×2 and a size of image represented by the first gray level signals is 320×200 dots, the algorithm converts each 6 bit (N=6) gray level signal to four 4 bit (M=4) gray level signals to generate 640×400 dot image. Since an aspect ratio of image display area of the LCD differs from an aspect ratio of image display area of the CRT, it is required to add some horizontal dot lines to the 640×400 dot images, where one horizontal dot line has the same dot pattern as that of the just preceding horizontal dot line.

BRIEF DESCRIPTION OF THE DRAWINGS

FIG. 2 shows a block diagram of a configuration of the display system.

FIGS. 5, 6 and 7 show dot patterns generated in accordance with the present invention.

FIG. 9 shows a dot pattern generated in accordance with the flow chart of FIG. 8 of the present invention.

FIG. 10 shows one example of an alternate table.

FIGS. 11, 12, 13 and 14 show how a dot pattern is generated in the prior art.

DESCRIPTION OF THE PREFERRED EMBODIMENTS

Figure 1:
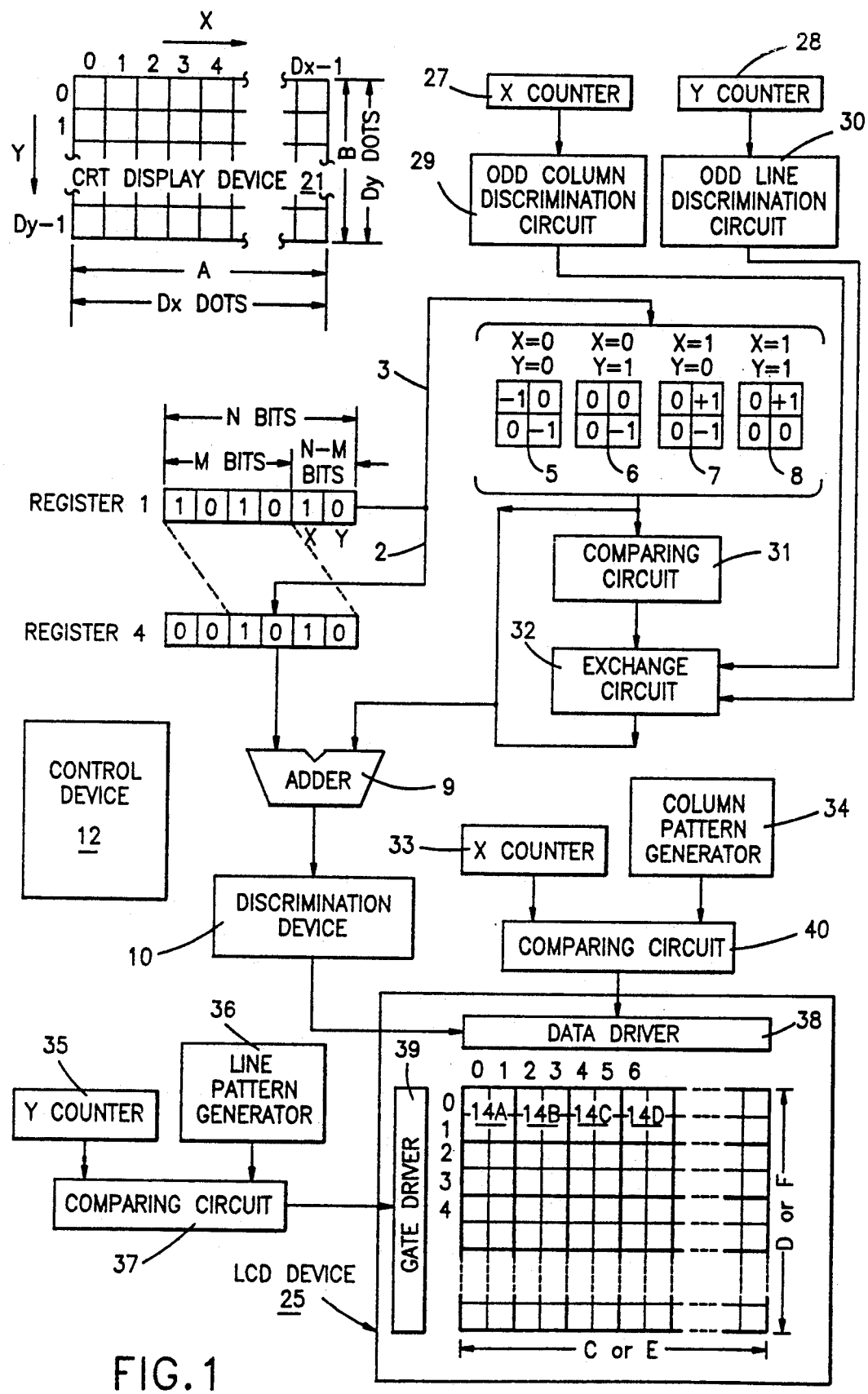
FIG. 1 shows a block diagram of the display system of the present invention.

The present invention solves a problem encountered in trying to use the algorithm for displaying an image on the LCD display 25 of FIG. 1. It is assumed that the Dx dots of the CRT display device 21 is equal to 320 dots, and the Dy dots is equal to 200 dots. Since one pel displayed by the CRT display device 21 is displayed by four pels of the LCD device 25, 640 dots in the X direction and 400 dots in the Y direction are required in the LCD device 25, as shown in FIG. 3.

An aspect ratio of the image displayed on the CRT display device 21 is fixed as A:B. A vertical scanning speed of an electron beam of the CRT display device 21 is, which determines a pitch between the horizontal scanning lines, controlled to repeatedly display the same horizontal image dots on two horizontal scan lines. That is, 200×2=400 horizontal scan lines are displayed within the size B of the CRT display device 21. This control is made by adjusting the values of capacitors coils and resistor in the CRT deflection circuit. In contradistinction to the CRT display device, a pitch between pels of the LCD device is determined at its fabrication. In the most cases, the aspect ratio C:D of the displayed image area of the LCD device 25 differs from the aspect ratio A:B of the displayed image area of the CRT display device 21, whereby the image displayed on the LCD device 25 is compressed or stretched in the vertical direction in comparison with the image displayed on the CRT display device 21.

Figure 3:
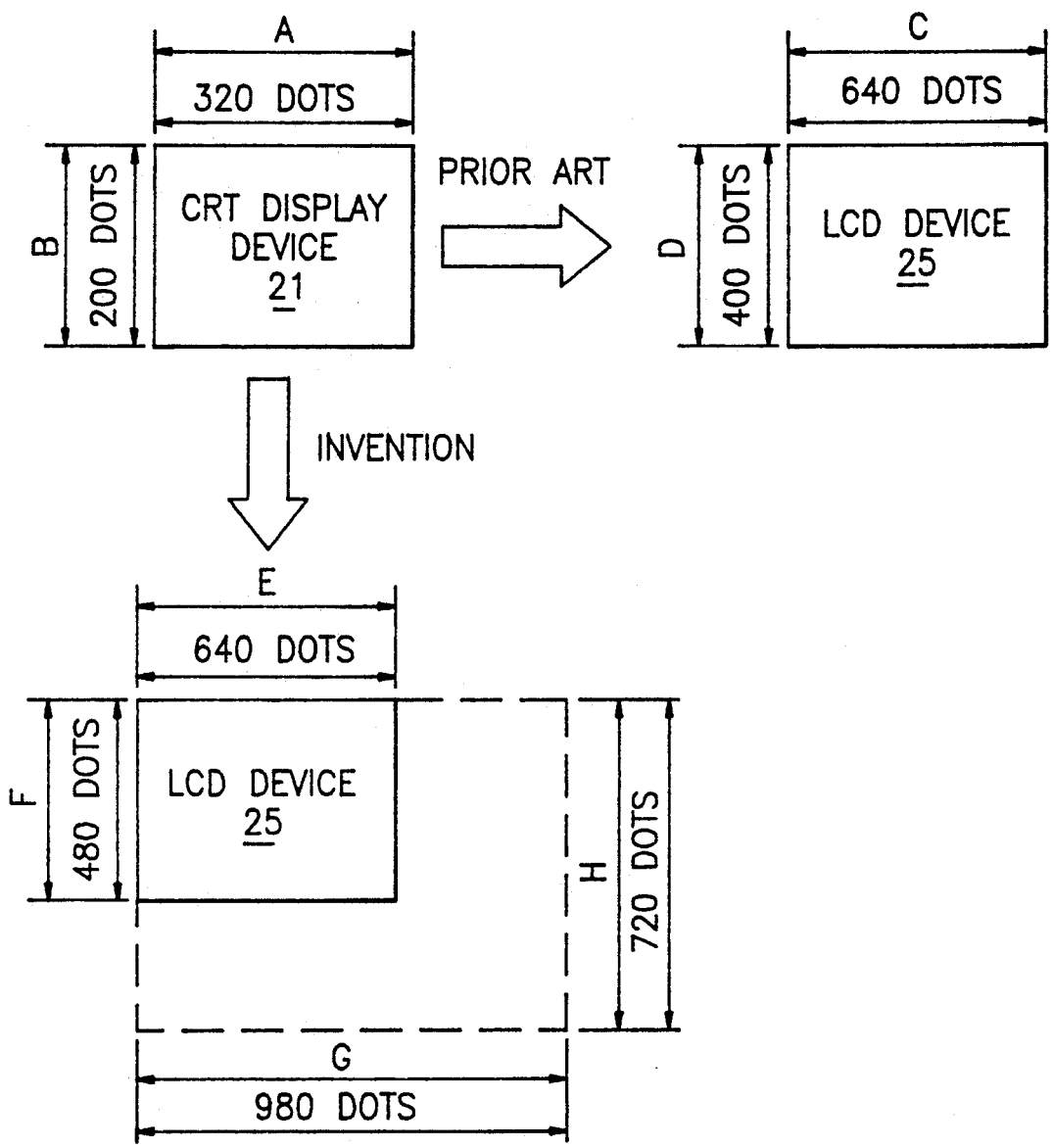
FIG. 3 shows the number of horizontal and vertical dots and aspect ratio of various display devices.

To solve the problem, a LCD device having 640 dots in the horizontal direction and 480 dots in the vertical direction, as shown in the FIG. 3, is used to display the image of the same aspect ratio as that of the CRT display device, i.e. A:B=E:F. The pitch of the LCD device of 640×480 dots is equal to that of the LCD device of 640×400 dots. To realize A:B=E:F, one horizontal image line was added or inserted every five horizontal image lines, and the same image as that of the just preceding image line is repeatedly displayed on the added line. However, a new problem is raised by the addition of the lines.

Before, describing the new problem, the algorithm of the Japanese patent application 63-236291 is described since the new problem arises as the result of the combinational use of the algorithm and the addition of the lines.

With reference to the FIG. 1, the blocks 1, 2, 3, 4, 5, 6, 7, 8, 9, 10, 12, 21 and 25 are the blocks of the Japanese patent application 63-236291, as described hereinbefore. The purpose of the algorithm of the patent application is to respond to one 6 bit signal for one pel, such as pel (0,0), of the CRT display device 21 to generate four 4 bit signals for displaying 4 dot image on the four pels of an area 14A of the LCD device 25.

It will be assumed, for purpose of the description, that the control device 12 generates a gray level signal, i.e. 6 bit signal, 101010 (decimal value 42), which signal is stored in the register 1. Next, the control device 12 supplies the higher 4 bits, i.e. M bits, 1010 of the 101010 signal into the lower 4 bit positions of the register 4 through the line 2. The higher 2 bit positions of the register 4 are always 0.0. The reason for concatenating the higher 2 bits in the register 4 will be described below. The control device 12, on the line 3, supplies the lower 2 bits, i.e. N−M bits, of the gray level signal 101010 as an address to select one of the Tables 5, 6, 7 and 8, which form a dither matrix. The number of tables used is determined by $2^{N-M}$, so that 4 tables are prepared. The lower 2 bits are represented by x and y in FIG. 1. Where, N is an integer larger than or equal to 2 and M is an integer satisfying $N>M\geq 1$. Since x=1 and y=0, the table 7 is selected. Each table stores 4 modification values, i.e. P×Q, satisfying $P\times Q \geq 2^{N-M}$ and each distinctive set of modification values corresponds to 4 dots of each of the area 14A, 14B, 14C, 14D, etc. in the LCD devices 25. The modification values are represented in FIG. 1 by their decimal values, but as 0 corresponds to the binary value 00000 and 1 corresponds to the binary value 00001, these binary values are actually stored in the tables. Any value in the range from +15 to −15 is used as the modification value. From the viewpoint of fidelity, the preferred range is +3 to −3. The modification value has 5 bits representing +15 to −15, and a negative value is represented by the complement of 2. A single higher bit is concatenated to the 5 bits from the table by a sign extension. For example, in the case where the modification value is +1,0001 is stored in the table, and 0 is concatenated to the 00001 by the sign extension, so that the input to the adder 9 from the table is 000001. In the case where the modification value in the table is −1, 11111 is stored in the table, 1 is concatenated to the 11111 by the sign extension, so that 111111 is supplied to the adder 9. Since the input to the adder 9 from the tables is 6 bits, the input from register 4 is also made to be 6 bits, so that it will be seen why the 2 leading 0 bits are concatenated in the register 4.

To generate a gray level signal for the dot (0,0) of the area 14A of the LCD device 25, the control device 12 first concatenates the bit 0 to the upper left modification value 00000 in the Table 7, and supplies the 000000 to the adder 9.

Next, the control device 12 activates the adder 9 to add both the inputted bits from the Table and from the register 4. That is, the 000000 representing the upper left modification value 0 in the Table 7 is added to the 001010 (2+M bits), and the total value 001010 is generated.

The control device 12 operates to supply the total value 001010 to the discrimination device 10. The discrimination device 10 generates a signal on the output line in accordance with the total value received. In particular, device 10 generates a signal corresponding to the value 15 (binary value 1111) on the output line, if the total value is larger than 15; generates 0 (binary value 0000) on the output line, if the total value is smaller than 0, that is, the total value is a negative value; and supplies the lower 4 bits of the total value on the output line, if the total value satisfies $15 \geq$ total value $\geq 0$. To perform the discrimination, the upper 2 bits of the total value are determined or tested. When the most significant bit of the total value is 1, it indicates that the total value is negative. When the value of the higher 2 bits of the total value is 01, it indicates that the total value is larger than 15, and when the value of the higher 2 bits of the total value is 00, it indicates that the relation $15 \geq$ total value $\geq 0$ is satisfied. In the case of the upper left modification value in the table 7, the total value is 001010, so that the 4 bits 1010 are supplied to the LCD device 25 as the gray level signal for the dot (0, 0) in the area 14A, whereby a gray level of 10 (i.e. binary value 1010) is displayed at the dot (0, 0) of the display device 25.

Next, in order to generate a gray level signal for the dot (1, 0) in the area 14A of the display device 25, the control device 12 reads out the upper right modification value 1 (binary value 00001) in the table 7, converts it to the 6 bits 000001 by the sign extension, supplies those 6 bits to the adder 9 and supplies the 6 bits 001010 in the 2+M register 4 to the adder 9. Next, both of these values are added. The total value is 001011 and it satisfies $15 \geq$ total value $\geq 0$, so that the bits 1011 are supplied to the LCD device 25 as the gray level signal for the dot (1, 0) in the area 14A, whereby a gray level of 11 (binary value 1011) is displayed at the dot (1, 0) of the display device 25.

The control device 12 performs the level conversion operation for the second dot (1, 0) in the dot line 0 of the CRT display device 21, in the same manner, whereby the gray level signals for the dots (2, 0) and (3, 0) in the area 14B of the LCD device 25 are generated and these dots are displayed. Similarly, the third dot and subsequent dots in the dot line 0 of the display device 21 may be converted, and two dots in the area 14C and the subsequent areas may be displayed. In this manner, the same image may be displayed on both of the display devices 21 and 25, while the number of gray levels and the number of dots of the display device 21 differ from that of the display device 25. As desired, both devices may be operated simultaneously or the display device 25 may be operated, while the display device 21 is not operated, and vice versa.

The gray level signals for the dots of the line 2 of the LCD device 25 are generated in the same manner. In this case, the lower left modification value 0 and the lower right modification value −1 are used to generate the gray level signals for the dots (0, 1) and (1, 1) on the line 1 of the LCD device 25.

In this manner, the same image as that of the CRT display device 21 is displayed on the LCD device 25 of 640×400 dots, i.e. the aspect ratio of C:D, shown in the FIG. 3. However, the aspect ratio C:D is not equal to A:B of the CRT display device 21. Then, one horizontal image line was added every five horizontal lines to display the image of the aspect ratio of E:F(=A:B) on the LCD device of 640×480 dots shown in FIG. 3. FIGS. 11-14 show the results of the addition of the horizontal line. In these FIGS. 11-14, the leftmost 4×4 dot matrix shows the dither matrix tables 5-8 in FIG. 1, the middle images show the image dots for the LCD device of 640×400 dots generated by the Japanese patent application 63-236291, and the rightmost images show the images for the LCD device of 640×480 dots generated by adding or inserting the new line.

Although the sum of the value (M bits) and the modification value of the tables is displayed in each pel of the LCD device, only the modification values are shown in FIGS. 11-14, since the value (M dots) is considered as a constant value.

The new problem raised by the use of the Tables 5, 6, 7 and 8 and the addition of the horizontal line is, as follows.

The four Tables 5, 6, 7 and 8 of 2×2 dots are called as the dither matrix to display four gray levels specified by the bits X and Y (M−N bits) in the register 1 in FIG. 1. When human eyes look the 2×2 dither dot pattern, the human eyes recognize the 2×2 dots of the dither image as a single pel.

Figures 11, 12:
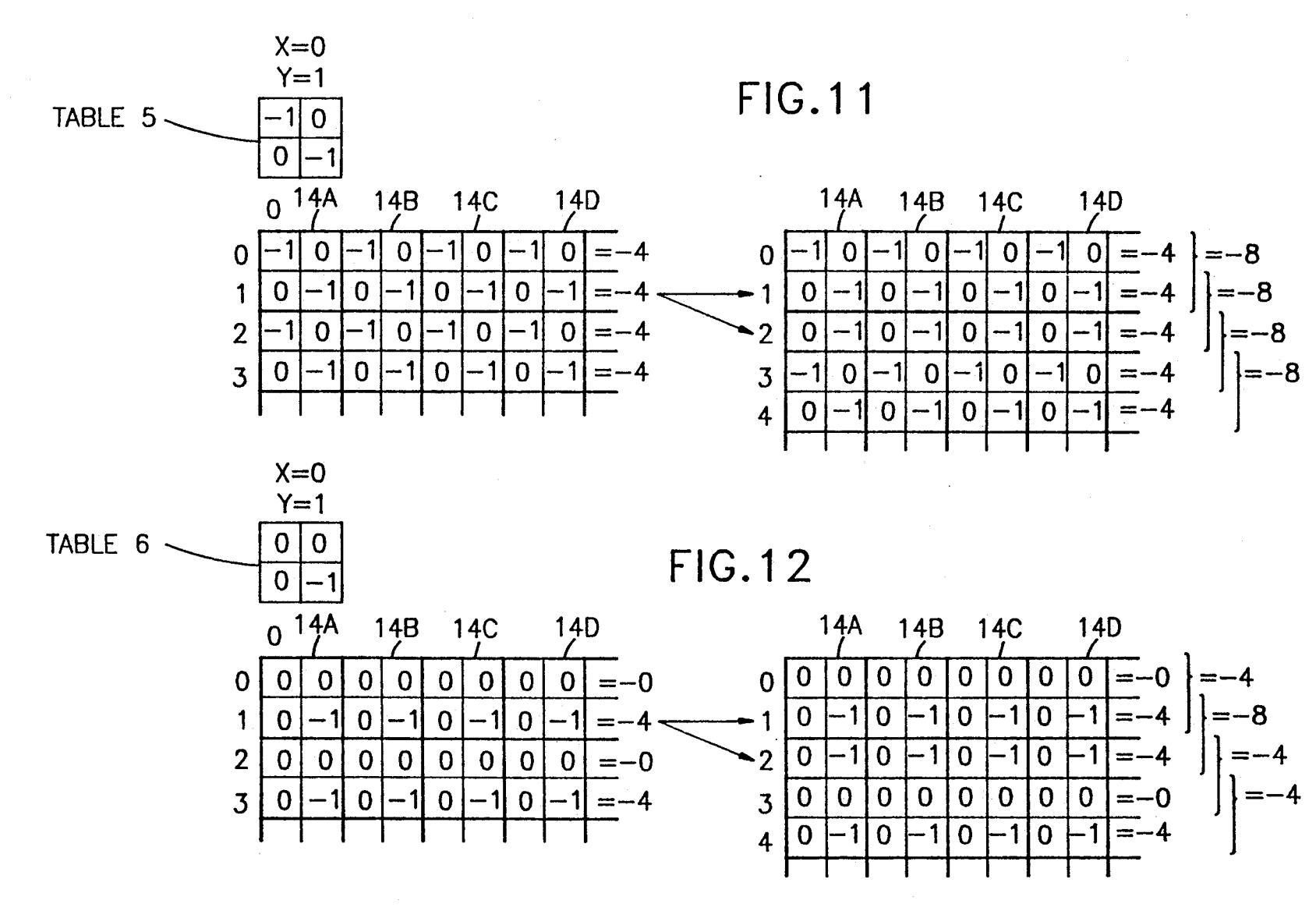
Figures 13, 14:
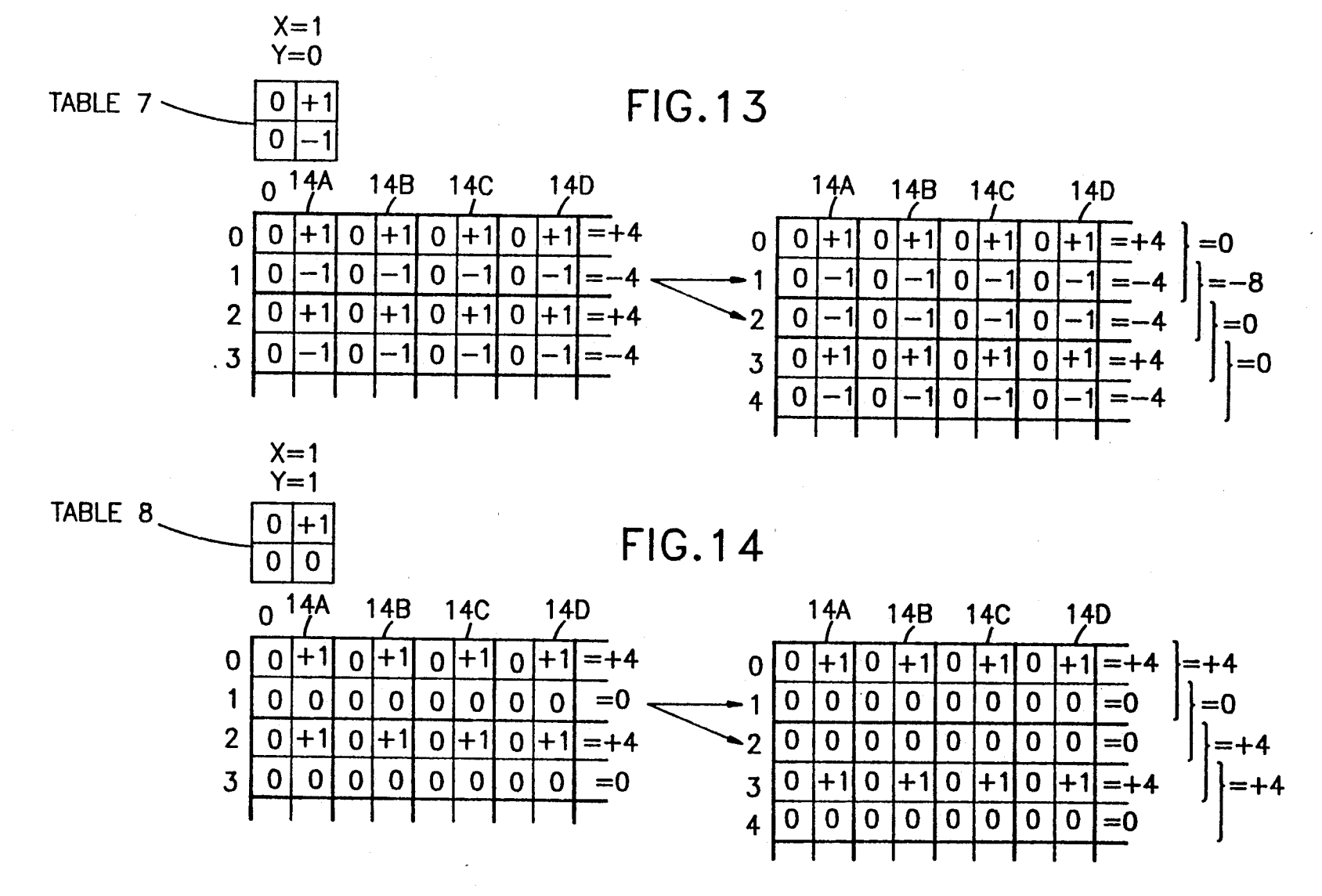

Reviewing the middle dot pattern of FIGS. 11-14 from the above viewpoint, all the middle dot patterns give the human eyes natural or smooth gray level since a sum of gray levels of any 2×2 dot matrix in all the middle dot patterns has the same value. That is, a sum of gray levels of any 2×2 dot matrix of the middle dot image in FIG. 11 is a value −2, similarly, the sum in the FIG. 12 is a value −1, the sum in FIG. 13 is a value 0, and the sum in the FIG. 14 is a value +1.

However, it has been found that when one horizontal dot line 2 having the same dot pattern as that of the just preceding dot line 1 is added or inserted, as shown in the rightmost dot patterns of FIGS. 11-14, an image line of different gray level from the remaining portion is observed by the human eyes in the case of FIGS. 12-14.

Referring to FIG. 11, the sums of gray levels of two dot lines 0 and 1, 1 and 2, 2 and 3, and 3 and 4 of the rightmost dot image are equal to the value −8, that is all the sums are equal to each other, so that the rightmost dot image with the added dot line 2 is observed as a smooth gray scale image by the human eyes.

Referring to the sums of the gray levels of two dot lines 1 and 2 in FIGS. 12-14, the sum of the two dot lines 1 and 2 differ from the sums of the remaining two dot lines 0 and 1, 2 and 3, 3 and 4, whereby the two dot lines 1 and 2 are observed by the human eyes as one image line a gray level of which differs from the remaining portion. Such image line degrades a quality of the displayed image.

Figure 4:
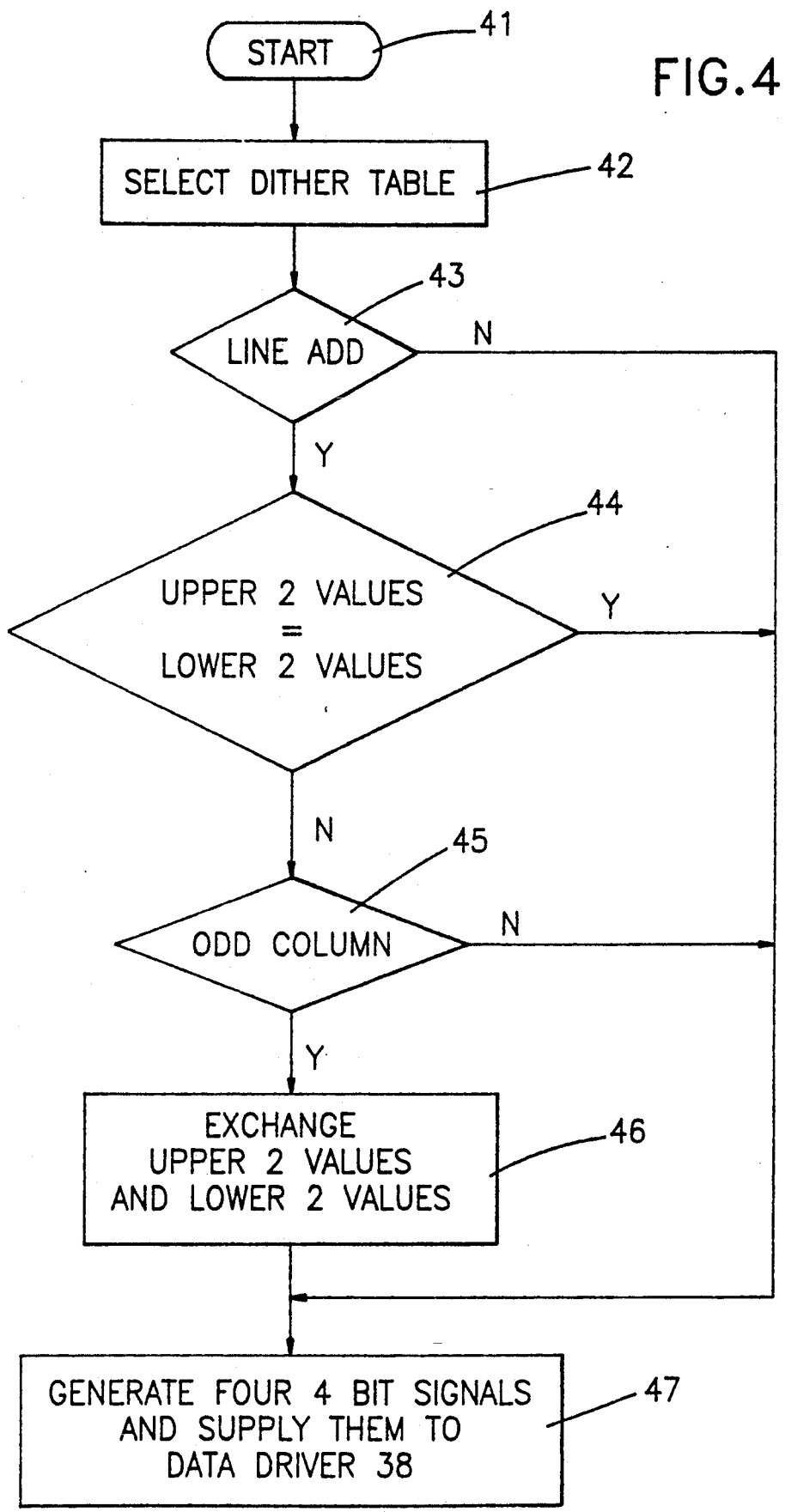
FIG. 4 shows a flow chart of one embodiment of the present invention.

Referring to FIG. 1, with reference to the flow chart of FIG. 4, the operation starts at the pel position (0, 0). The control device 12 initially resets the registers 1 and 4, X counter 27, Y counter 28 and Y counter 35. And, the control device 12 operates an odd column discrimination circuit 29, a line pattern generator 36 and a comparing circuit 37 since, in this case, the horizontal lines of the LCD device 25 are added or inserted.

The invention solves the problem described hereinbefore raised by the dither Tables 6, 7 and 8. It is assumed that the 6 bits signals for all the pels on the pel lines 0 and 1 of the CRT display device 21 is 101010. The 6 bit signals are supplied from a data processing device, such as the personal computer 20.

OPERATION A

The operation starts at a block 41. The control device 12 stores the 6 bit signal, i.e. 101010 for the pel position (0, 0) of the CRT display device 21 in the register 1, and selects one of the dither tables, i.e., the Table 7, in a block 42.

Figures 5, 6:
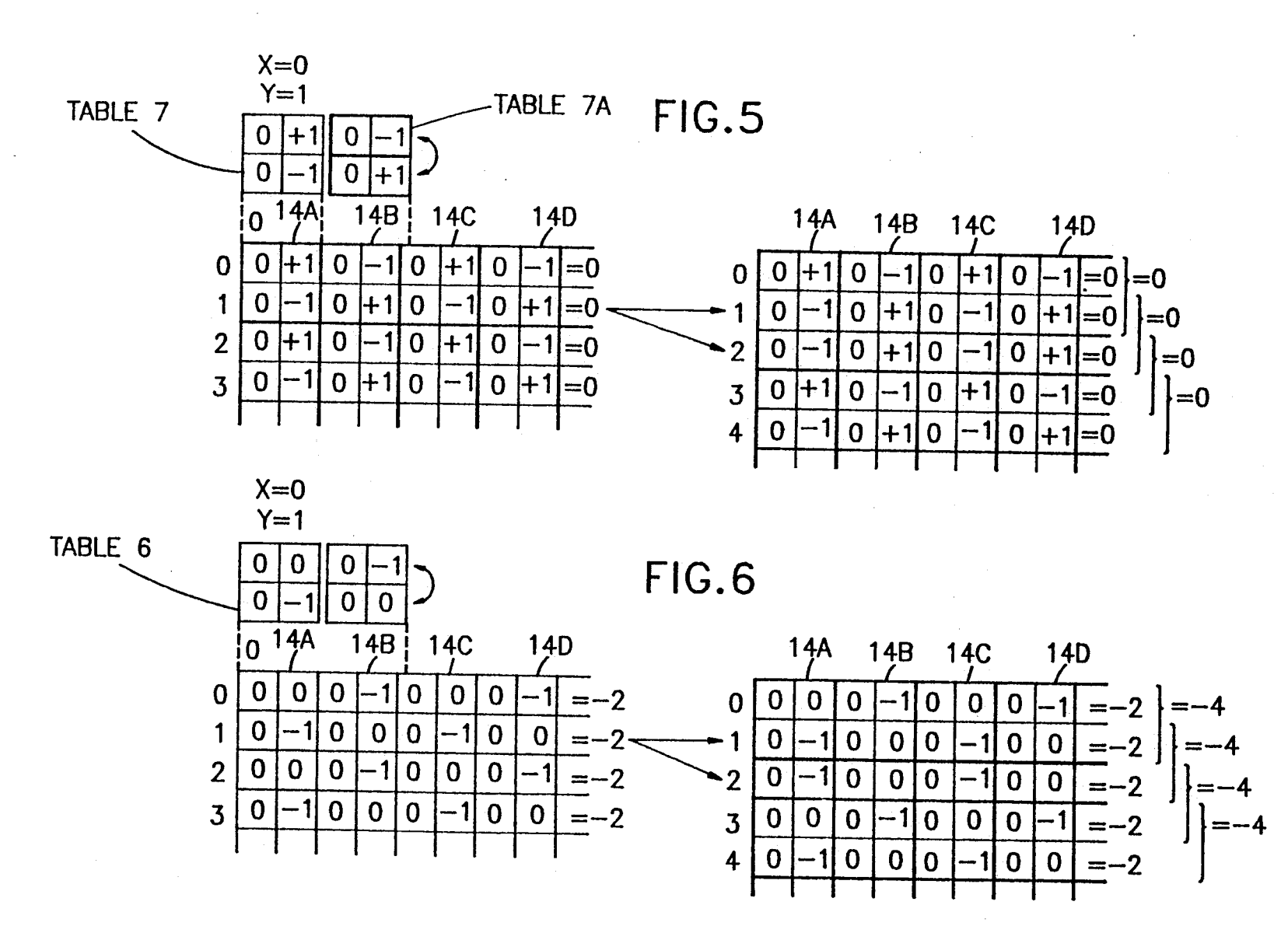

The operation proceeds to a block 43, which determines whether the addition of the horizontal line, i.e., the line 2 of the rightmost image pattern in FIG. 5, is required. If the answer is NO, the operation proceeds to a block 47. In this case, the answer is YES, the operation proceeds to a block 44, which determines whether the sum, i.e., the value +1, of the upper 2 upper values of the dither Table 7 is equal to the sum, i.e., the value −1, of the lower 2 values of the Table 7. The comparing circuit 31 performs the operation of the block 44. If the answer is YES, the operation proceeds to the block 47. In this case, the answer is NO, then the operation proceeds to a block 45, which determines whether the 6 bit signal is used for the odd column pel of the CRT display device 21. The odd column discrimination circuit 29 performs the operation of the block 45. If the answer is YES, the operation proceeds to a block 46. In this case, the pel position (0, 0) is located in the even column, the answer is NO, then the operation proceeds to the block 47, which performs the operation of the adder 9 and the discrimination device 10, described hereinbefore, whereby the gray levels, i.e. 0 and +1, of the upper two pels (on the dot line 0) in the area 14A of the rightmost pattern of FIG. 5 are generated.

OPERATION B

Next, the gray level signals of the upper two pels of the area 14B of the rightmost pattern in FIG. 5, which are located on the line 0 are generated, as follows.

The X counter 27 is advanced to the value 1. Therefore, the control device 12 stores the 6 bit signal 101010 of the pel position (1, 0) in the register 1. And, the operation starts from the block 41. In the block 42, the dither matrix 7 is selected, and the operation proceeds to the block 43 which generates the answer YES. And, in the block 44, the sum, i.e. the value +1, of the upper two values in the Table 7 are compared to the sum, i.e. the value −1, of the lower two values in the Table 7. Since the answer of the block 44 is NO, the operation proceeds to the block 45, which determines whether the 6 bit signal is being used for the odd column of the CRT display device 21. In this case, since the pel position (1, 0) is in the odd column, the answer of the block 45 is YES. That is, the odd column discrimination circuit 29 generates an output signal for activating an exchange circuit 32. The operation proceeds to the block 46, which exchanges the upper two values 0 and +1 of the table 7 and the lower two values 0 and −1, as shown in FIG. 5. The operation proceeds to the block 47. In the block 47, the gray levels 0 and −1 of the upper two pels (on the dot line 0) in the area 14B of the rightmost pattern of the FIG. 5 are generated.

OPERATION C

To generate the gray level signals of the upper two pels of the area 14C of the rightmost pattern in FIG. 5, the X counter 27 is advanced to the value 2, and the control device 12 stores the 6 bit signal 101010 of the pel position (2, 0) of the CRT display device 21 in the register 1. And, the similar operation as the operation A is performed. It is however noted that, in this case, the answer of the block 4S is NO, so that the exchange of the values of the table 7 in the block 46 is not performed. And, the gray level signals 0 and +1 for the upper two pels of the area 14C are generated.

OPERATION D

To generate the gray level signals of the upper two pels of the area 14D of the rightmost pattern in FIG. 5, the X counter 27 is advanced to the value 3, and the control device 12 stores the 6 bit signal 101010 of the pel position (3, 0) of the CRT display device 21 in the register 1. And, the similar operation as the operation B is performed. It is noted however that, in this case, the answer of the block 45 is YES, then the exchange of the values of the table 7 in the block 46 is performed. And, the gray level signals 0 and −1 for the upper two pels of the area 14D are generated.

In this manner, the 6 bit signals of the pels of the pel line 0 for the CRT display device 21 supplied from the personal computer or data processing device 20 are sequentially stored in the register and sequentially processed by the algorithm of FIG. 4 to generate the gray level signals for the pels on the pel line 0 of the LCD device 25. The gray level signals are supplied to the data driver 38 of the LCD device 25 for displaying the image on the line 0.

Next, the gray level signals for the pels of the line 1 of the LCD device 25 are generated, as follows. Since the 6 bit signals for the pels on the line 0 of the CRT display device 21 are used to generate the gray level signals for the pels on both the lines 0 and 1 of the LCD device 25, the above 6 bit signals for the pels of the line 0 of the CRT display device 21 are again sequentially processed by the algorithm of FIG. 4.

It is noted however that the lower two values of Tables 7 and 7A is used to generate the gray level signals of the pels of the line 1 of the LCD device 25. That is, the lower two values 0 and −1 of Table 7 are used for the even areas 14A and 14C, and the lower two values 0 and +1 of Table 7A, which is exchanged for the values 0 and −1 are used for the odd areas 14B and 14D.

Next, the line 2 is added after the line 1 of the right most pattern of FIG. 5. To this end, when the gray scale signals of the dot on the line 1 of the LCD device 25 is supplied from the data driver 38 to the LCD cells (or pels), gate lines 1 and 2 are simultaneously activated by a gate driver 39. To perform the operation, Y counter 35, a line pattern generator 36 and a comparing circuit 37 are provided. The Y counter 35 is initially reset to the value 0, and advanced to value 1, 2, 3, . . . by the control device 12. The control device 12 initially stores in the line pattern generator 36 the values 1, 6, 11, . . . , which indicate the lines after which one new line is added. The comparing circuit 37 compares the value of the Y counter 35 with the value of the line pattern generator 36. If both the values are equal, the comparing circuit 37 supplies a signal to the gate driver 39. The gate driver 39 sequentially activates the gate lines, i.e. dot lines, in synchronism with the Y counter 35, when the signal is not supplied from the comparing circuit 37. When the gate driver 39 is preparing the activation of the line 1, and the signal is supplied from the comparing circuit 37, the gate driver 39 responds the signal to simultaneously activate both the lines 1 and 2, whereby the same image as that of the line 1 is simultaneously displayed on the line 2. Next, the gray level signals for the lines 3 and 4 of the LCD device 25 are generated in the manner described hereinbefore.

Now, reviewing the completed rightmost pattern of FIG. 5 from the viewpoint that the human eyes recognize the 2×2 pels of the dither image as a single pel, all the sums of the gray levels of the two lines 0 and 1, 1 and 2, 2 and 3 and 3 and 4 are same, that is, all the sums are equal to the value 0. The problem shown in FIG. 13, which uses Table 7, is that the sum of the gray scale values of the lines 1 and 2, i.e. the value −8, differs from the other values 0, whereby the lines 1 and 2 including plural 2×2 dither dots are recognized as one image line of the different gray level by the human eyes. It is apparent that the problem is completely solved by the present invention, as shown in FIG. 5.

Figure 7:
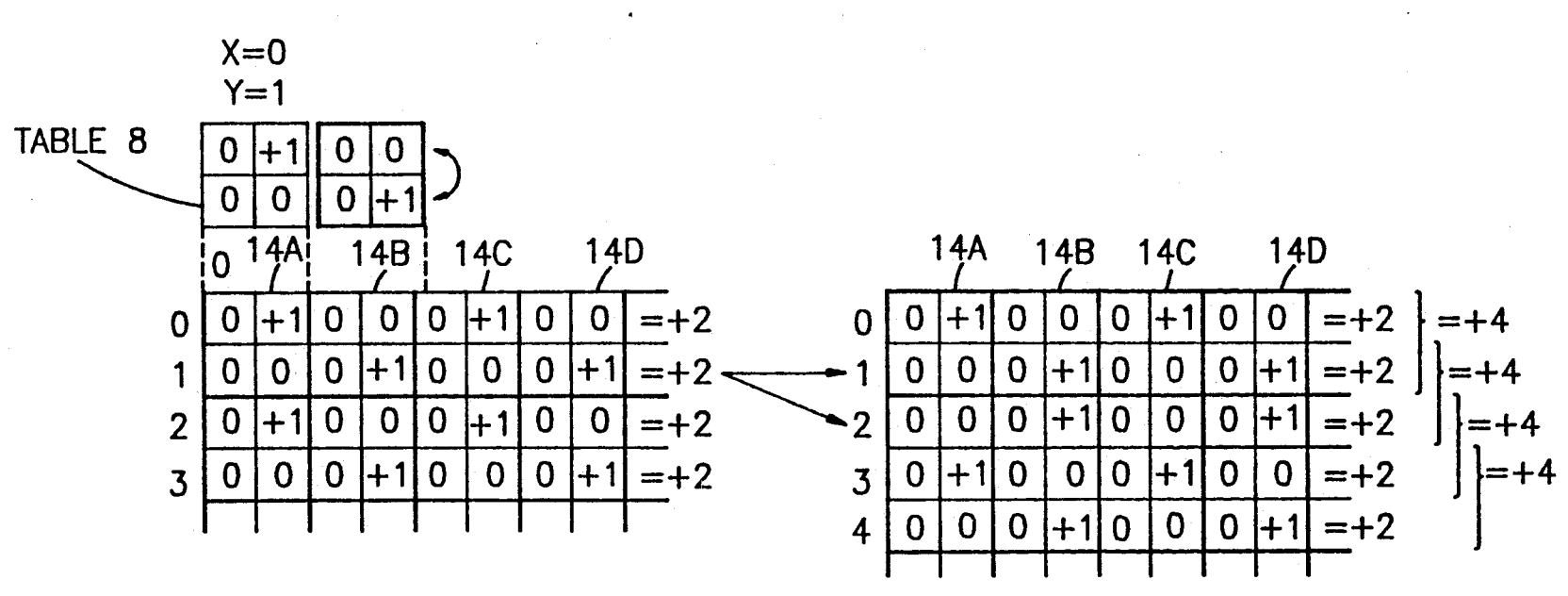

The dot patterns generated by using Tables 6 and 8 and the algorithm of the present invention are shown in the rightmost dot patterns in FIGS. 6 and 7. The sums i.e. the values −4 and +4 the gray levels of the lines 1 and 2 of the rightmost patterns in FIGS. 6 and 7 are equal to the sums of the remaining two lines, while the sums, i.e. the values −8 and 0, of the gray levels of the lines 1 and 2 in FIGS. 12 and 14 without using the algorithm of the present invention, respectively differ from other sums. That is, the problem in FIGS. 12 and 14 is also solved by the present invention.

The same problem as that raised in the case that the horizontal lines are added or inserted also raises in the case that the vertical columns are added or inserted. Although a figure showing the problem in the addition of the vertical columns is not included in the attached drawings, the problem is easily understood by those skilled in the art from FIGS. 12-14.

Figure 8:
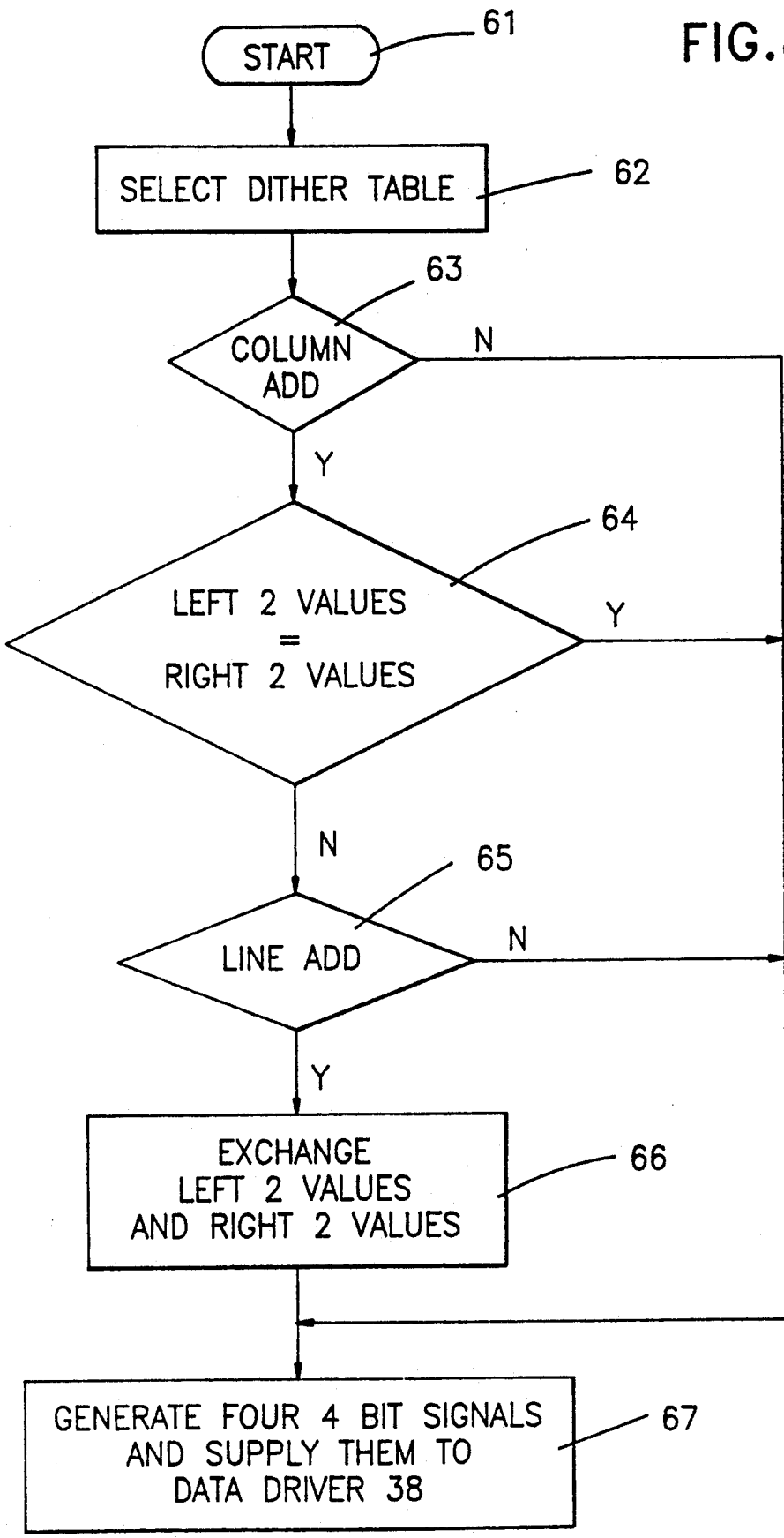
FIG. 8 shows a flow chart of another embodiment of the present invention.

An algorithm of the present invention shown in FIG. 8 solves the problem, that is the appearance of vertical dot column with different gray level from that of the remaining image. The algorithm shown in FIG. 8 is substantially the same as that shown in FIG. 4, except that a block 63 determines whether vertical pel columns should be added or inserted to expand a horizontal 640 pels to 980 pels, a block 64 determines whether a sum of the left side two values in the dither Table is equal to a sum of the right side two values in the dither Table, a block 65 determines whether the 6 bit signal is being used for the odd line of the CRT display device 21, and a block 66 exchanges the left side two values and the right side two values to generate a modified Table, such as a Table 6A in FIG. 9.

Therefore, the comparing circuit 31 compares the sum of the left side two values of the table with the right side two values. And, the exchange circuit 32 exchanges the left side two values and the right side two values.

The control device 12 initially resets the registers 1 and 4, the X counter 27, Y counter 28 and X counter 33. And, the control device 12 operates an odd line discrimination circuit 30, a column pattern generator 34 and a comparing circuit 40, since, in this case, the vertical dot lines or dot columns are added or inserted.

A lower pattern for the LCD device 25 shown in FIG. 9 shows the resultant pattern with one dot column 2 being added. In FIG. 9, Table 6 is used. The column 2 has the same image dots as that of column 1. The addition of column 2 after column 1 is performed by X counter 33, column pattern generator 34 and comparing circuit 40. To this end, when the gray scale signal of column 1 is supplied to the data driver 38, the gray scale signal of column 1 is copied into the next column 2, so that the same gray scale dots as that of column 1 is displayed in the column 2 of the LCD device 25. To perform the insertion operation, control device 12 initially stores the value 1 corresponding to column 1 in column pattern generator 34. The X counter 33 is advanced from the value 0 to the value 1, 2, 3, . . . The comparing circuit 40 compares the value of X counter 33 and the value of column pattern generator 34 to supply a signal to data driver 38 when both the values are equal, whereby the same gray level dots as that of column 1 are displayed on column 2.

Briefly describing the operation for generating the lower pattern of FIG. 9 by using the algorithm of FIG. 8, the gray level signals of the line 0 and 1 are generated, and column 2 is added. During the processing of lines 0 and 1, the values of Table 6 are used since block 65 generates the answer NO, that is, the odd line discrimination circuit 30 does not supply the activation signal to the exchange circuit 32. When the 6 bit signals on line 1 for the CRT display device 21 are processed, the odd line discrimination circuit 30 activates the exchange circuit 32 in the block 65, and the exchange circuit 32 exchanges the right side value 0 and −1 and the left side values 0 and 0 of Table 6 in block 66, whereby the gray levels on lines 2 and 3 of the LCD device 25 are displayed, as shown in the lower pattern of FIG. 9. The operation is repeated to generate the gray scale signals of lines 4–7 of the lower pattern in FIG. 9.

The resultant lower pattern in FIG. 9 shows that the sum, i.e. the value −2, of the gray levels of columns 1 and 2 including plural 2×2 dither dots is equal to the other sums of the gray levels of columns 0 and 1, column 2 and 3 and columns 3 and 4, whereby the problem that column 1 and 2 is recognized at one column of different gray level by the human eyes is completely solved.

In the above embodiments, although the Tables of 2×2 matrix are used, the Tables of P×Q modification values satisfying $P \times Q \geq 2^{N-M}$ can be used. A Table of 3×3 matrix is shown in FIG. 10 as one example. To perform the exchange of the values of the Table in block 46, the values in lines A, B and C in Table 81 are exchanged to generate Table 82, as shown in FIG. 10. And, to perform the exchange in block 66, the values in column A, B and C in Table 83 are exchanged to generate Table 84.

As described hereinbefore, the invention solves the problem, i.e. the appearance of image line of different gray level raised by the addition of the horizontal dot lines or the vertical dot columns.

Having thus described our invention what we claim as new and desire to secure as Letters Patent, is:

1. A display system for converting N bit signals each, representing $2^N$ gray scale levels, to M bit signals representing $2^M$ gray levels, where N is an integer larger than or equal to 2 and M is an integer satisfying $N > M \geq 1$, said system comprising:

means for separating each of said N bit signals into higher M bits and N−M bits; $2^{N-M}$ tables each of which stores a distinctive set of P×Q modification values satisfying $P \times Q \geq 2^{N-M}$ means for selecting one of said tables using said N−M bits;

means for detecting unequality between first set of modification values and second set of modification values of said selected table, means for exchanging said first set of modification values and said second set of modification values to generate a modified table of said selected table;

means for adding said M bits of one N bit signal and each of the modification values of said selected table to generate first set of P×Q M bit signals, and for adding said M bits of next N bit signal and each of the modification values of said modified table to generate second set of P×Q M bit signals;

and means for supplying said first and second sets of M bit signals to a display device of $2^M$ gray levels.

2. A display system according to claim 1, wherein said display device receives said first and second sets of P×Q M bit signals to display them on Q image lines and the same image as that of the Qth image line on one additional line.

3. A display system according to claim 1, wherein said first set of modification values in said table are P modification values arranged in first horizontal line in said table, and said second set of modification values in said table are P modification values arranged in second horizontal line in said table.

4. A display system according to claim 1, wherein said first set of modification values in said table are Q modification values arranged in first vertical column in said table, and said second set of modification values in said table are Q modification values arranged in second vertical line in said Table.

5. A method for converting N bit signals each, representing $2^N$ gray levels, to M bit signals representing $2^M$ gray levels, where N is an integer larger than or equal to 2 and M is an integer satisfying $N > M \geq 1$, said method comprising the steps of:

separating each of said N bit signals into higher M bits and lower N−M bits;

creating $2^{N-M}$ tables each of which stores a distinct set of P×Q modification values satisfying $P \times Q 2 \geq^{N-M}$;

selecting one of said tables using said N−M bits;

detecting unequality between first set of modification values and second set of modification values of said selected table;

exchanging said first set of modification values and said second set of modification values to generate a modified table of said selected table;

adding said M bits of one N bit signal and each of the modification values of said selected table to generate first set of P×Q M bit signals and adding said M bits of next N bit signal and each of the modification values of said modified table to generate second set of P×Q M bit signals; and supplying said first and second sets of M bit signals to a display device of $2^M$ gray levels.

6. A method according to claim 5, wherein said display device receives said first and second sets of P×Q M bit signals to display them on Q image lines and the same image as that of Qth image line on one additional line.

7. A method according to claim 5, wherein said first set of modification values in said table are P modification values arranged in first horizontal line in said table, and said second set of modification values in said table are P modification values arranged in second horizontal line in said table.

8. A method according to claim 5, wherein said first set of modification values in said table are Q modification values arranged in first vertical column in said table, and said second set of modification values in said table are Q modification values arranged in second vertical column in said table.

* * * * *